United States Patent [19]

Reichard

[11] Patent Number: 5,015,927
[45] Date of Patent: May 14, 1991

[54] ELECTRIC MOTOR WITH REGENERATION CURRENT COMMUTATION

[75] Inventor: Jerome J. Reichard, Menomonee Falls, Wis.

[73] Assignee: Thor Technology Corporation, Milwaukee, Wis.

[21] Appl. No.: 389,874

[22] Filed: Aug. 4, 1989

[51] Int. Cl.⁵ .............................................. H02K 29/00
[52] U.S. Cl. ...................................... 318/139; 318/254
[58] Field of Search ............... 318/138, 811, 135, 139, 318/800, 806, 254

[56] References Cited

U.S. PATENT DOCUMENTS

| | | | |
|---|---|---|---|
| 3,391,318 | 7/1968 | Hirokawa | 318/138 |
| 4,027,215 | 5/1977 | Knight et al. | |
| 4,162,435 | 7/1979 | Wright | 318/138 |
| 4,169,990 | 10/1979 | Erdman | 318/254 |
| 4,238,717 | 12/1980 | Knight et al. | |
| 4,403,177 | 9/1983 | Weber et al. | |
| 4,446,406 | 5/1984 | Uzuka | |
| 4,492,903 | 1/1985 | Knight et al. | |
| 4,495,450 | 1/1985 | Tokizaki et al. | |
| 4,575,668 | 3/1986 | Baker | 318/811 |
| 4,620,272 | 10/1986 | Fulton et al. | 318/806 |
| 4,642,537 | 2/1987 | Young | |
| 4,743,815 | 5/1988 | Gee et al. | |
| 4,825,132 | 4/1989 | Gritter | 318/811 |

*Primary Examiner*—William M. Shoop, Jr.
*Assistant Examiner*—J. W. Cabeca
*Attorney, Agent, or Firm*—Andrus, Sceales, Starke & Sawall

[57] ABSTRACT

In a plural phase electric motor, a control method senses regeneration current from a non-energized phase and commutates to the next state. In the next state, the unenergized phase of the present state is energized in a polarity opposing the regeneration current of the present state, such that during the next state, energization current is directed in the last noted phase in a direction opposite to the regeneration current of the present state. In the state prior to the present state, the unenergized phase of the present state is energized in a polarity aiding the regeneration current of the present state, such that during the prior state, energization current is directed in the last noted phase in the same direction as the regeneration current of the present state. In the preferred embodiment, all of the commutation switches are periodically simultaneously turned off for a given blanking interval, and the regeneration current is sensed on a common DC bus during such interval.

18 Claims, 7 Drawing Sheets

ELECTRIC MOTOR WITH REGENERATION CURRENT COMMUTATION

BACKGROUND AND SUMMARY

The invention relates to commutation control methods and circuitry for electric motors including at least three phases energized in a cyclic sequence having a plurality of states, wherein during each state, two of the phases are energized and the third phase is unenergized.

In a plural phase electric motor, the phases are energized to create a rotating magnetic field, which the rotor will follow due to the torque produced thereon. To sustain rotation of the rotor, the phase windings are energized in a given sequence having a plurality of states. The change from one state or to the next state is called commutation. Commutation ensures continued rotation of the magnetic field, and hence continued rotation of the rotor. It is desirable to know the position of the rotor, in order to select the proper commutation timing and energization state of the various windings, and hence provide the optimum magnetic field pattern for producing optimum torque on the rotor. When the rotor passes a given position, it is desired to commutate to the next state in the energization sequence of the phase windings, to continue to apply torque to the rotor.

In the control of variable speed electric motors, it is desirable to have feedback of motor speed. This feedback typically consists of an external sensor that connects to the motor shaft and directly reads the rotor information. This external sensor adds an undesirable cost to the motor control, and requires additional wiring to the motor. The burden of these extra wires is compounded in applications such as air conditioning compressors, where the motor is hermetically sealed. It is therefore desired in various applications to eliminate external sensors and extra wires.

Various sensorless motor control systems are known in the prior art. In one method, back emf of an unenergized phase is sensed to control commutation to the next state. In another method, changing reluctance of the unenergized phase is sensed as a function of rotor position, to control commutation to the next state. In the latter method, the unenergized phase winding is pulsed with a test current to determine changing reluctance.

In the present invention, regeneration current is sensed from the unenergized phase, and the motor is commutated to the next state in response to such regeneration current. In the preferred embodiment, bus regeneration current is sensed with all commutation switches off. In an alternate embodiment, individual phase regeneration current is sensed.

DETAILED DESCRIPTION

Figure 1:
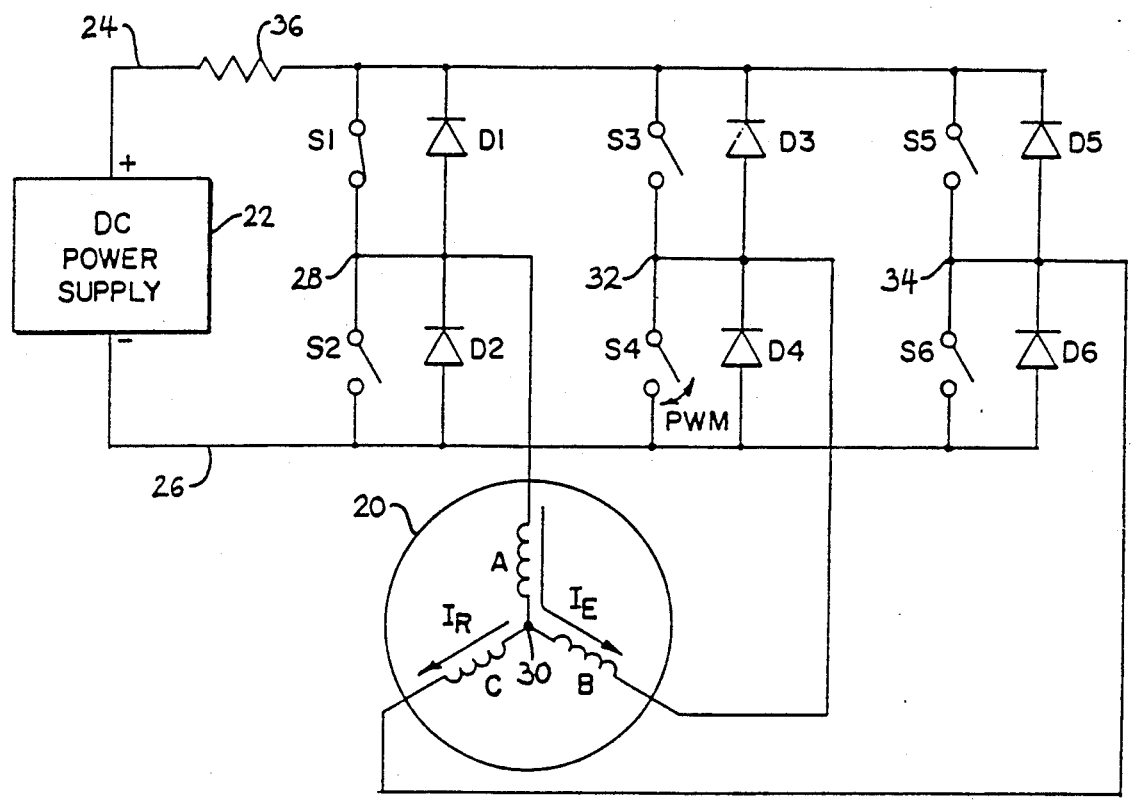
FIG. 1 schematically illustrates circuitry for carrying out the control method in accordance with the present invention, and shows a first energization state.
Figure 2:
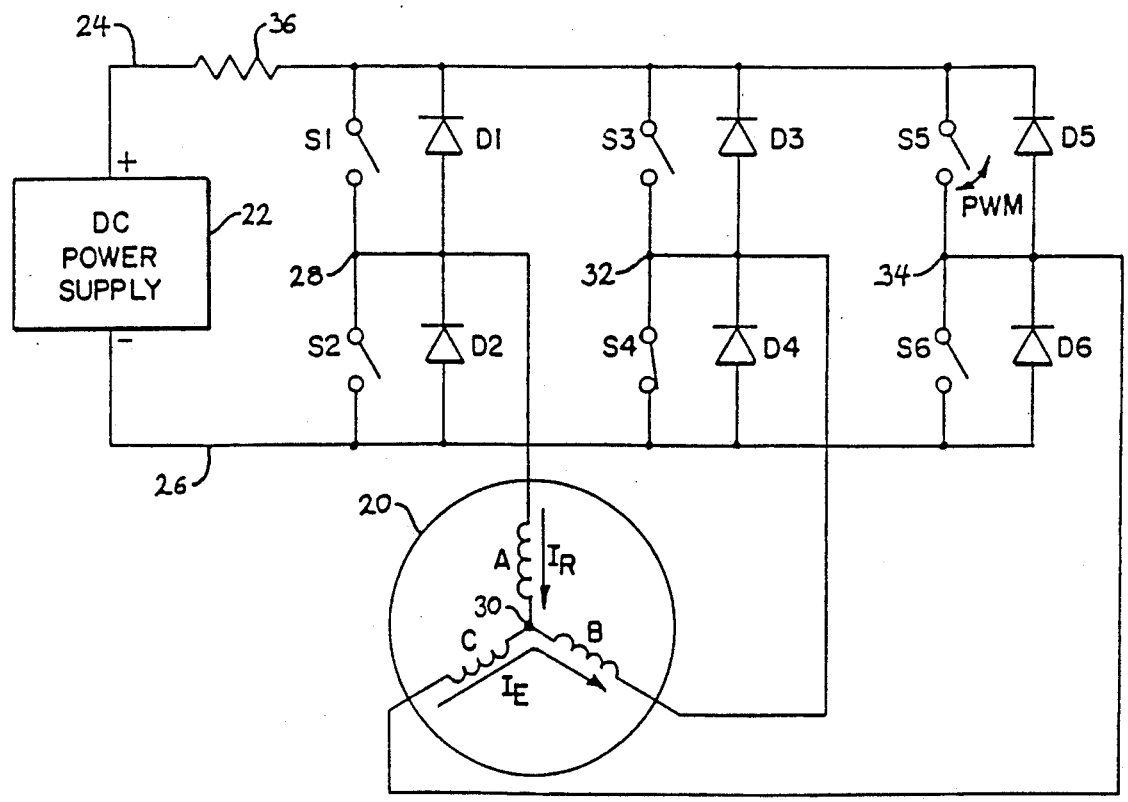
FIG. 2 is like FIG. 1 and shows a second energization state.
Figure 3:
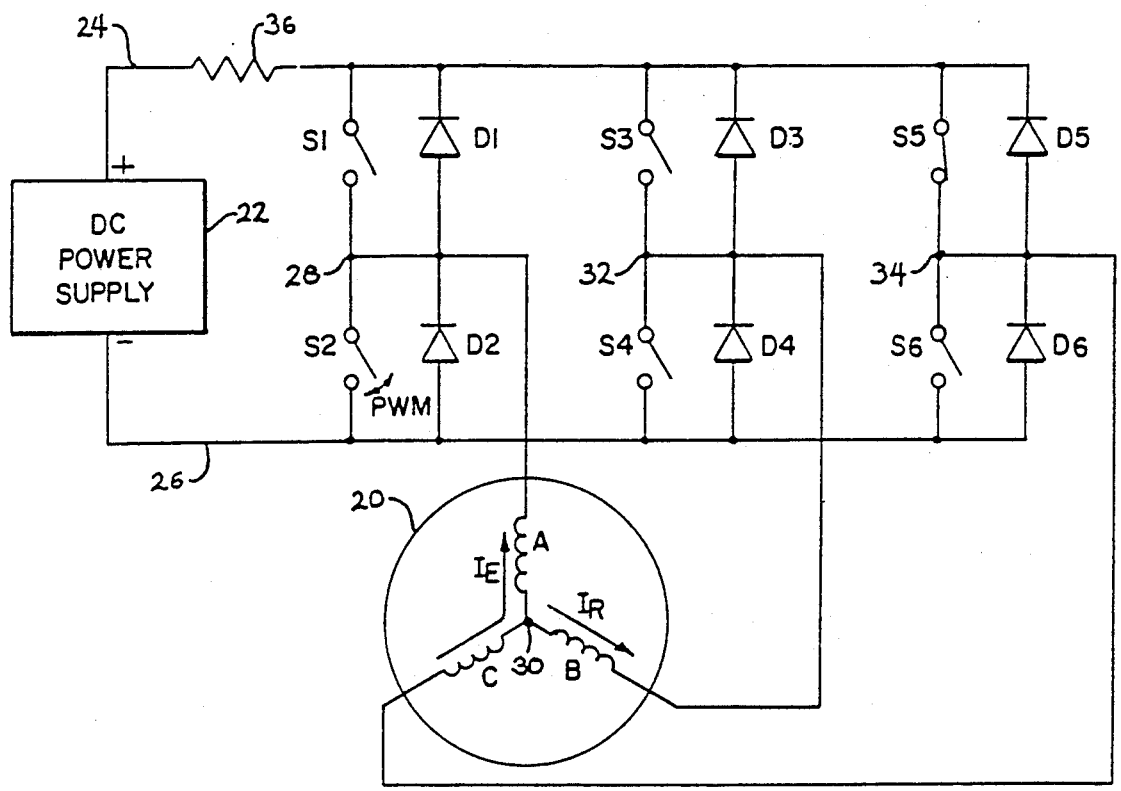
FIG. 3 is like FIG. 1 and shows a third energization state.
Figure 4:
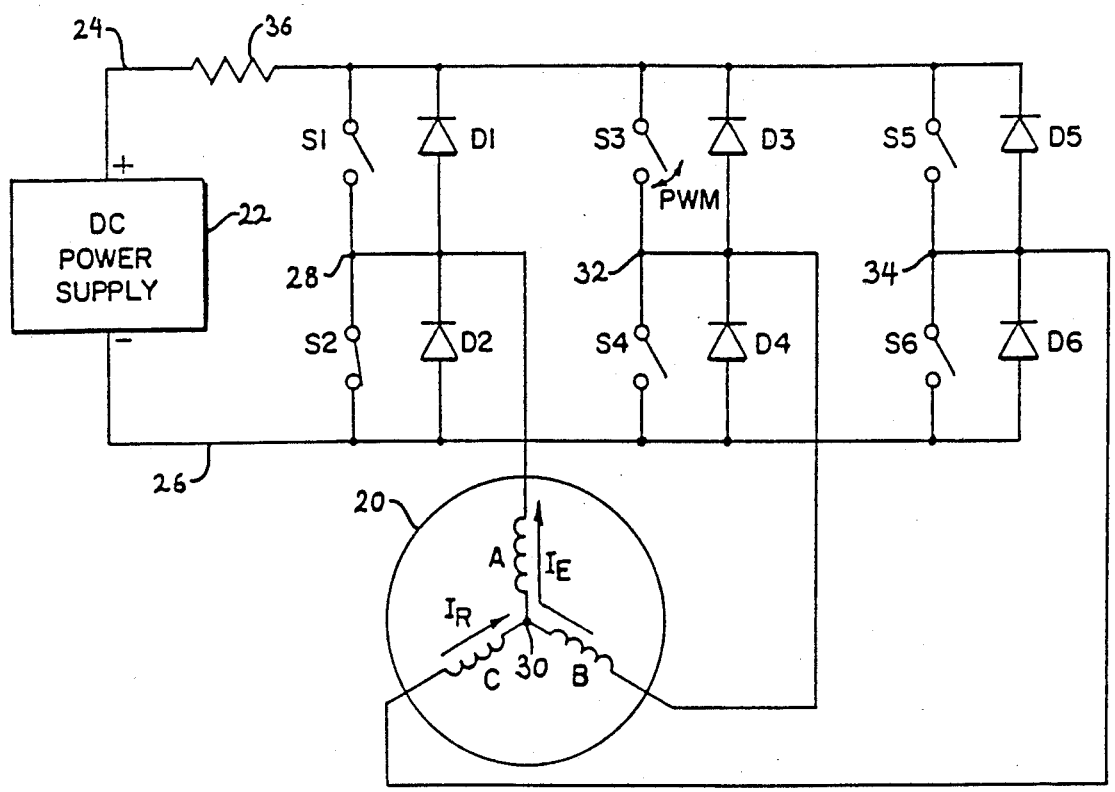
FIG. 4 is like FIG. 1 and shows a fourth energization state.
Figure 5:
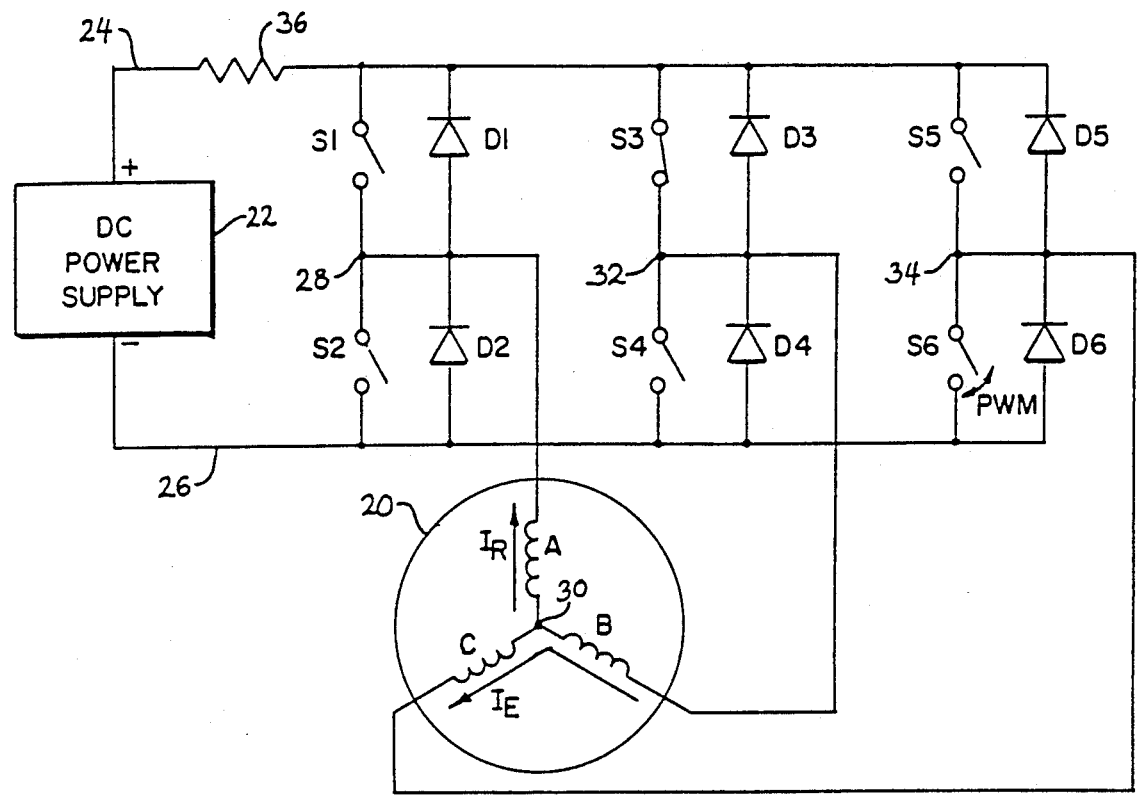
FIG. 5 is like FIG. 1 and shows a fifth energization state.
Figure 6:
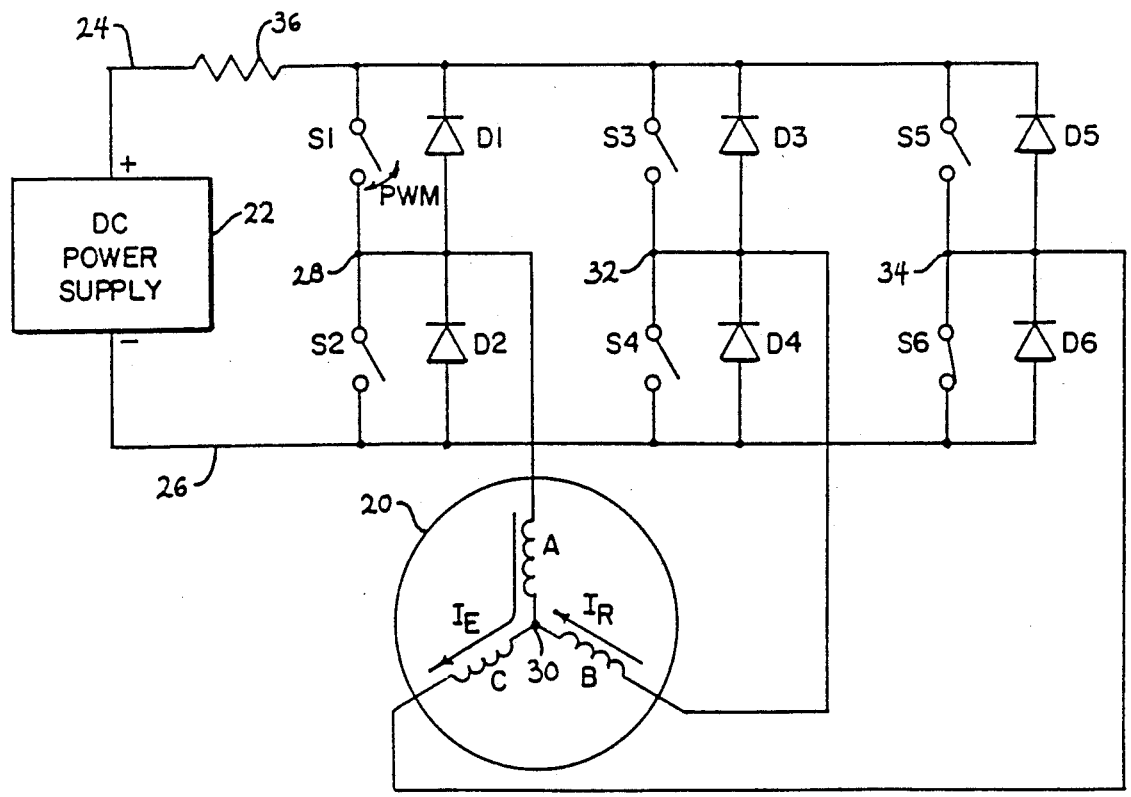
FIG. 6 is like FIG. 1 and shows a sixth energization state.

FIG. 1 shows an electric motor 20 comprising three phases A, B and C. The motor phase windings are energized through switches S1, S2, S3, S4, S5, and S6 from a DC power supply 22, which may be a rectified and filtered AC source (not shown). Switches S1, S3 and S5 are connected to positive DC bus terminal 24. Switches S2, S4 and S6 are connected to negative DC bus terminal 26. Diodes D1, D2, D3, D4, D5 and D6 are connected in reverse parallel with respective switches S1-S6. The phase A winding has one end connected to a node 28 between switches S1 and S2, and another end connected to a common phase node 30. The phase B winding has one end connected to a node 32 between switches S3 and S4, and another end connected to common phase node 30. The phase C winding has one end connected to a node 34 between switches S5 and S6, and another end connected to common phase node 30.

In energization state 1, switch S1 is closed, and switch S4 is pulse width modulated between on and off conditions to regulate a constant current through motor phases A and B, as shown at energization current $I_E$. At initiation of this state, switch S4 is closed until the current, for example as sensed by bus current sensing resistor 36, rises to a given level, and then switch S4 is opened for an off interval, during which bus current decreases, and at the end of such interval, switch S4 is again closed until the sensed bus current again rises to the noted given level, whereupon switch S4 is opened, and so on. In this manner, a constant current, at least within a given range in a sawtooth current waveform, is regulated through the motor. Pulse width modulation for constant motor current regulation is known in the art.

In the present invention, regeneration current in the unenergized phase, for example phase C in state 1, FIG. 1, is sensed, and the drive is commutated to the next state. This regeneration current is shown at $I_R$ in FIG. 1, and indicates that the rotor field has moved past its alignment position with the stator, and that the motor is starting to regenerate current through phase C. Periodically during state 1, all switches S1-S6 are turned off for a blanking interval. During this blanking interval, current continues to flow through phase windings A and B due to their inductance. This inductive current continues to flow in the same direction as energization current $I_E$, and hence flows from phase winding B through diode D3, through bus terminal 24 to DC source 22 and is returned through bus terminal 26 through diode D2 and back to phase winding A. If there is no regeneration current in phase winding C, then the inductive current through phase windings A and B as flowing leftwardly through current sensing resistor 36 will be the same but opposite in polarity to the energization current flowing rightwardly through current sensing resistor 36 during the on states of switches S1 and S4. Thus, during the noted blanking interval of switches S1–S6 during state 1, the inductive current will be equal to but opposite in polarity to the energization current when switches S1 and S4 are on.

If, however, during the blanking interval of switches S1–S6, the rotor field has moved past its alignment position, and the motor is regenerating current, then regeneration current $I_R$ will appear in phase winding C. This regeneration current $I_R$ flows from phase winding C through diode D5 leftwardly through current sensing resistor 36 and bus terminal 24 to DC power supply 22 and is returned through bus terminal 26 and diode D2 and phase winding A to phase winding C. This regeneration current $I_R$ adds an extra current component in the leftward current flow through current sensing resistor 36. Hence, the sum of such regeneration current $I_R$ and the noted inductive current is greater than the noted energization current $I_E$ That is, during state 1, with switches S1 and S4 closed, energization current $I_E$ flows rightwardly through bus terminal 24 and current sensing resistor 36, through switch S1, through the phase A winding, through the phase B winding, through switch S4 and through bus terminal 26 back to DC power supply 22. This is the noted energization current $I_E$. During the noted blanking interval, with all switches S1–S6 open, and assuming the rotor has moved past its optimum alignment position, there is both inductive current and regeneration current flowing leftwardly through current sensing resistor 36 and bus terminal 24, the sum of which is greater than the noted energization current $I_E$. The regeneration current $I_R$ provides the additional current component.

In state 1, the present method senses bus current flow rightwardly through bus conductor 24 and current sensing resistor 36, through switch S1, through the phase A winding, through the phase B winding, through switch S4 to bus conductor 26. During the blanking interval in state 1, with all switches S1–S6 open, the opposite direction of bus current flow is sensed from bus conductor 26 through diode D2, through the phase A winding due to inductance of the latter, through the phase B winding due to inductance of the latter, through diode D3 and leftwardly through current sensing resistor 36 and bus conductor 24, plus regeneration current through the phase C winding and diode D5 leftwardly through current sensing resistor 36 and bus conductor 24, to cummulatively sense on the DC bus the inductive current in phases A and B and the regeneration current in phase C. The motor is commutated to state 2 when the sum of the inductive current in phases A and B flowing leftwardly through bus conductor 24 and the regeneration current in phase C flowing leftwardly through bus conductor 24 is greater than the energization current for phases A and B flowing rightwardly through bus conductor 24.

In state 1, phases A and B are energized. Regeneration current in phase C is sensed, and the motor is commutated to state 2 in response to such regeneration current.

In state 2, phase C is energized in the opposite polarity as regeneration current $I_R$ in state 1. Phase B is energized in the same polarity as energization current $I_E$ in state 1. Regeneration current $I_R$ in phase A is sensed in the same polarity as energization current $I_E$ in state 1. The motor is commutated to state 3 in response to this last noted regeneration current $I_R$.

In state 3, phase A is energized in the opposite polarity as regeneration current $I_R$ in state 2, and in the opposite polarity as energization current $I_E$ in state 1. Phase C is energized in the same polarity as energization current $I_E$ in state 2. Regeneration current $I_R$ in phase B is sensed in the same polarity as energization current $I_E$ in state 2. The motor is commutated to state 4 in response to this last noted regeneration current $I_R$.

In state 4, phase B is energized in the opposite polarity as regeneration current $I_R$ in state 3 and in the opposite polarity as energization current $I_E$ in state 2. Phase A is energized in the same polarity as energization current $I_E$ in state 3. Regeneration current $I_R$ in phase C is sensed in the same polarity as energization current $I_E$ in state 3. The motor is commutated to state 5 in response to this last noted regeneration current $I_R$.

In state 5, phase C is energized in the opposite polarity as regeneration current $I_R$ in state 4, and in the opposite polarity as energization current $I_E$ in state 3. Phase B is energized in the same polarity as energization current $I_E$ in state 4. Regeneration current $I_R$ in phase A is sensed in the same polarity as energization current $I_E$ in state 4. The motor is commutated to state 6 in response to this last noted regeneration current $I_R$.

In state 6, phase A is energized in the opposite polarity as regeneration current $I_R$ in state 5, and in the opposite polarity as energization current $I_E$ in state 4. Phase C is energized in the same polarity as energization current $I_E$ in state 5. Regeneration current $I_R$ in phase B is sensed in the same polarity as energization current $I_E$ in state 5. The motor is commutated to state 1 in response to this last noted regeneration current $I_R$.

In state 1, phase B is energized in the opposite polarity as regeneration current $I_R$ in state 6, and in the opposite polarity as energization current $I_E$ in state 5. Phase A is energized in the same polarity as energization current $I_E$ in state 6. Regeneration current $I_R$ in phase C is sensed in the same polarity as energization current $I_E$ in state 6. The motor is commutated to state 2 in response to this last mentioned regeneration current $I_R$, and so on to repeat the cycle.

In state 1, switch S1 is turned on, and switch S4 is pulse width modulated between on and off conditions to provide the above noted constant current regulation. In state 2, switch S4 is turned on, and switch S5 is pulse width modulated between on and off conditions to provide constant current regulation. In state 3, switch S5 is turned on, and switch S2 is pulse width modulated between on and off conditions to provide constant current regulation. In state 4, switch S2 is turned on, and switch S3 is pulse width modulated between on and off conditions to provide constant current regulation. In state 5, switch S3 is turned on, and switch S6 is pulse width modulated between on and off conditions to provide constant current regulation. In state 6, switch S6 is turned on, and switch S1 is pulse width modulated between on and off conditions to provide constant current 20 regulation. All switches S1–S6 are turned off simultaneously for the noted blanking interval at least once in each of the six states. Regeneration current is sensed during such blanking interval in each of the six states.

In state 1, regeneration current in phase C is sensed by sensing current through diode D5. In state 2, regeneration current in phase A is sensed by sensing current through diode D2. In state 3, regeneration current in phase B is sensed by sensing current through diode D3. In state 4, regeneration current in phase C is sensed by sensing current through diode D6. In state 5, regeneration current in phase A is sensed by sensing current through diode D1. In state 6, regeneration current in phase B is sensed by sensing current through diode D4.

As noted above, in state 1, rightward bus current flow in bus conductor 24 is sensed by sensing current flow from bus conductor 24 through switch S1, through the phase A winding, through the phase B winding, through switch S4 to bus conductor 26. During the blanking interval of switches S1–S6 in state 1, leftward bus current flow through bus conductor 24 is sensed by sensing bus current flow from bus conductor 26 through diode D2, through the phase A winding due to inductance of the latter, through the phase B winding due to inductance of the latter, through diode D3 to bus conductor 24, plus regeneration current through the phase C winding and diode D5 to bus conductor 24, to cummulatively sense on the bus the inductive current in phases A and B and the regeneration current in phase C. The motor is commutated to state 2 in response to a given differential between energization current $I_E$ rightwardly on bus conductor 24 and the sum of inductive current and regeneration current $I_R$ leftwardly on bus conductor 24, preferably when the noted latter sum is greater than the noted energization current $I_E$.

In state 2, energization current $I_E$ rightwardly on bus conductor 24 is sensed from bus conductor 24 through switch S5, through the phase C winding, through the phase B winding, through switch S4 to bus conductor 26. During the blanking interval of switches S1–S6 in state 2, leftward bus current flow through bus conductor 24 is sensed by sensing bus current flow from bus conductor 26 through diode D6, through the phase C winding due to inductance of the latter, through the phase B winding due to inductance of the latter, through diode D3 to bus conductor 24, plus regeneration current $I_R$ from bus conductor 26 through diode D2 and the phase A winding, to cummulatively sense on the bus the inductive current from phases C and B and the regeneration current $I_R$ from phase A. The motor is commutated to state 3 in response to a given differential between the last noted energization current $I_E$ in the rightward direction on bus conductor 24 and the last mentioned sum of the inductive current and regeneration current $I_R$ in the leftward direction on bus conductor 24.

In state 3, bus current flow in the rightward direction on bus conductor 24 is sensed by sensing current flow from bus conductor 24 through switch S5, through the phase C winding, through the phase A winding, through switch S2 to bus conductor 26. During the blanking interval of switches S1–S6 in state 3, the leftward direction of bus current flow on bus conductor 24 is sensed by sensing current flow from bus conductor 26 through diode D6, through the phase C winding due to inductance of the latter, through the phase A winding due to inductance of the latter, through diode D1 to bus conductor 24, plus regeneration current $I_R$ through the phase B winding and diode D3 to bus conductor 24, to cummulatively sense on the bus the inductive current from phases C and A and the regeneration current $I_R$ from phase B. The motor is commutated to state 4 in response to a given differential between the last noted energization current $I_E$ in the rightward direction on bus conductor 24 and the last noted sum of inductive current and regeneration current $I_R$ in the leftward direction on bus conductor 24, preferably when said sum exceeds said energization current.

In state 4, bus current flow rightwardly in bus conductor 24 is sensed by sensing current flow from bus conductor 24 through switch S3, through the phase B winding, through the phase A winding, through switch S2 to bus conductor 26. During the blanking interval of switches S1–S6 in state 4, the leftward direction of bus current flow on bus conductor 24 is sensed by sensing current flow from bus conductor 26 through diode D4, through the phase B winding due to inductance of the latter, through the phase A winding due to inductance of the latter, through diode D1 to bus conductor 24, plus regeneration current $I_R$ from bus conductor 26 through diode D6 and the phase C winding, to cummulatively sense on the bus the inductive current in phases A and B and the regeneration current $I_R$ in phase C. The motor is commutated to state 5 in response to a given differential between the last noted energization current $I_E$ in the rightward direction on bus conductor 24 and the last noted sum of inductive current and regeneration current $I_R$ in the leftward direction on bus conductor 24, and preferably when the last noted sum is greater than the last noted energization current $I_E$.

In state 5, the rightward direction of current flow on bus conductor 24 is sensed by sensing current flow from bus conductor 24 through switch S3, through the phase B winding, through the phase C winding, through switch S6 to bus conductor 26. During the blanking interval of switches S1–S6 in state 5, the leftward direction of bus current flow in bus conductor 24 is sensed by sensing current flow from bus conductor 26 through diode D4, through the phase B winding due to inductance of the latter, through the phase C winding due to inductance of the latter, through diode D5 to bus conductor 24, plus regeneration current through the phase A winding and diode D1 to bus conductor 24, to cummulatively sense on bus conductor 24 the inductive current in phases B and C and the regeneration current $I_R$ in phase A. The motor is commutated to state 6 in response to a given differential between the last noted energization current $I_E$ in the rightward direction on bus conductor 24 and the last mentioned sum of inductive current and regeneration current $I_R$ in the leftward direction on bus conductor 24, preferably when the last noted sum is greater than the last noted energization current $I_E$.

In state 6, the rightward direction of bus current flow on bus conductor 24 is sensed by sensing current flow from bus conductor 24 through switch S1, through the phase A winding, through the phase C winding, through switch S6 to bus conductor 26. During the blanking interval of switches S1–S6 in state 6, the leftward direction of bus current flow on bus conductor 24 is sensed by sensing current flow from bus conductor 26 through diode D2, through the phase A winding due to inductance of the latter, through the phase C winding due to inductance of the latter, through diode D5 to bus conductor 24, plus regeneration $I_R$ from bus conductor 26 through diode D4 and the phase B winding, to cummulatively sense on bus conductor 24 the inductive current in phases A and C and the regeneration current $I_R$ in phase B. The motor is commutated to state 1 in response to a given differential between the last noted energization current $I_E$ in the rightward direction on bus conductor 24 and the last noted sum of inductive current and regeneration current $I_R$ in the leftward direction on bus conductor 24, preferably when the last noted sum is greater than the last noted energization current $I_E$.

The control method of the present invention thus includes energizing the phases in a cyclic sequence comprising a plurality of states, wherein during each state, two of the phases are energized and the third phase is unenergized, sensing regeneration current from the unenergized phase, and commutating to the next state in response to the regeneration current. The method further includes, in the next state, energizing the unenergized phase of the present state in a polarity opposing the regeneration current of the present state, such that during the next state, energization current is directed in the last noted phase in a direction opposite to the regeneration current of the present state. The method further includes, in the state prior to the present state, energizing the unenergized phase of the present state in a polarity aiding the regeneration current of the present state, such that during the prior state, energization current is directed in the last mentioned phase in the same direction as the regeneration current of the present state. In the preferred embodiment, all of the commutation switches, such as S1-S6, are simultaneously turned off for a given blanking interval, and the regeneration current is sensed during such blanking interval. Such regeneration current is sensed by sensing current conduction through the noted reverse diodes D1-D6. One direction of bus current flow is sensed providing energization current supplied through the commutation switches to the two energized phases in the present state. The opposite direction of bus current flow from all three phases through the diodes is sensed during the noted blanking interval of the switches, to cummulatively sense on the bus the inductive current from the energized phases of the present state and the regeneration current from the unenergized phase of the present state. The motor is commutated to the next state in response to a given differential between the energization current in the one direction on the bus and the sum of the inductive current and regeneration current in the opposite direction on the bus. In the preferred embodiment, the motor is commutated to the next state when the sum of the inductive current and regeneration current in the opposite direction on the bus exceeds the energization current in the one direction on the bus. In an alternate embodiment, individual phase current sensors may be provided for sensing regeneration conduction current through the respective diodes.

Figure 7:
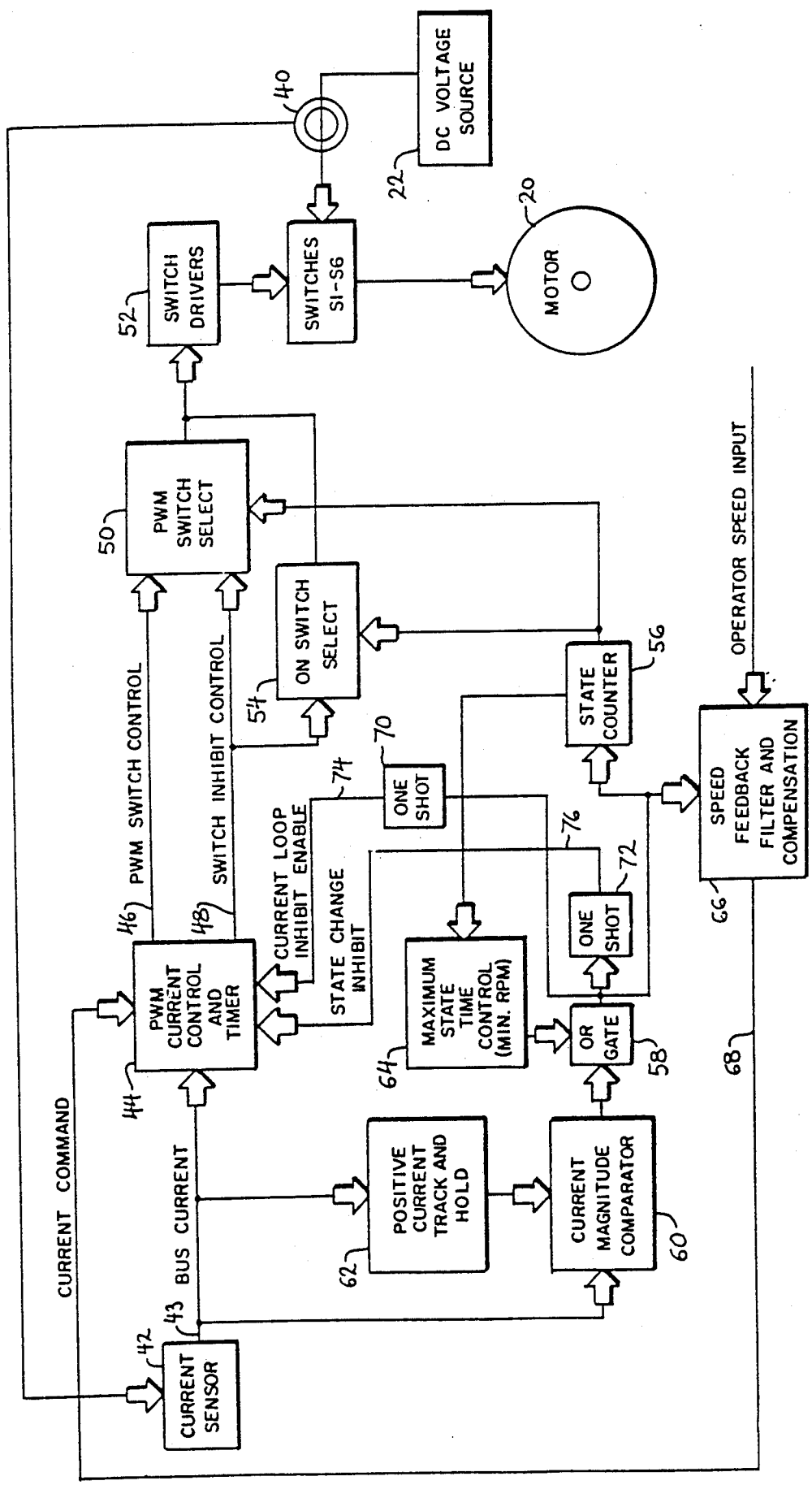
FIG. 7 shows control circuitry in accordance with the invention.

FIG. 7 illustrates circuitry for carrying out the method in accordance with the invention, and like reference numerals are used from FIGS. 1-6 where appropriate to facilitate understanding. DC voltage source 22 supplies energization current through commutation switches S1-S6 to motor 20. Bus current sensing may be provided by a series resistor as shown at 36 in FIGS. 1-6, or by an annular coil 40 around bus conductor 24 connected to a sensor 42. Various other types of current sensors may of course be used. Sensor 42 amplifies the signal from coil 40 and provides a sensed bus current signal at output 43 which is input to a PWM current control and timer circuit 44 providing timing signals at outputs 46 and 48. Output 46 provides timing pulses going high and low, and provides the above noted pulse width modulation constant current control. Output 48 provides a series of high and low timing pulses providing the above noted blanking interval for checking current regeneration.

PWM switch select circuit 50 is a multiplexer and selects which of the switch drivers 52 is to be pulse width modulated, which in turn pulse width modulates one of switches S1-S6. Switch drivers 52 are the amplifying and the gate drive circuitry for switches S1-S6, such as FETs or other semiconductor switches. On switch select circuit 54 is a multiplexer and selects one of the switch drivers 52 and its corresponding switch S1-S6 which is to be energized to an on condition. State counter 56 stores the cyclic sequence for energizing the phases in a plurality of states, and controls multiplexers 50 and 54 to select the switch to be pulse width modulated and the switch to be turned on continuously during the chosen state. For example, during state 1, state counter 56 commands PWM switch select multiplexer 50 to chose switch S4, and commands on switch select multiplexer 54 to choose switch S1. During state 2, state counter 56 commands PWM switch select multiplexer 50 to choose switch S5, and commands on switch select multiplexer 54 to choose switch S4, and so on for the remaining of the six states. The timing signal at output 48 of timer 44 provides a switch inhibit control to disable the output signals from multiplexers 50 and 54, such that all switches S1-S6 are off during the noted blanking interval.

State counter 56 is incremented from one state to the next by OR gate 58. One of the inputs to OR gate 58 is provided by current comparator 60. Output 43 of bus current sensor 42 is provided to current comparator 60, and is also provided to positive current track and hold circuit 62. Comparator 60 compares the above noted energization current $I_E$ from circuit 62 against the above noted sum of inductive current and regeneration current. When such sum exceeds the energization current $I_E$, the output of comparator 60 goes high which in turn causes the output of OR gate 58 to go high, which in turn increments state counter 56 to the next state, e.g. from state 1 to state 2, or from state 2 to state 3, etc. The other input to OR gate 58 is provided by a maximum state time control circuit 64. If a high output from current comparator 60 is not received within a given time interval, then state timer 64 provides a high signal to OR gate 58, such that the latter provides a high signal to state counter 56 to increment the latter to the next state, to provide a minimum motor speed. Timer 64 is reset upon commutation to the next state by state counter 56. Speed feedback filter and compensation circuit 66 enables operator speed input. Circuit 66 compares the desired speed as set by the operator with the frequency of transitions of the output of OR gate 58, and provides a current command signal at output 68 which is input to PWM timer 44. OR gate 58 also triggers one shot multivibrators 70 and 72 with respective outputs 74 and 76 providing a current loop inhibit enable signal and a state change inhibit signal, respectively, to be described, which are input to PWM timer 44.

Figure 8:
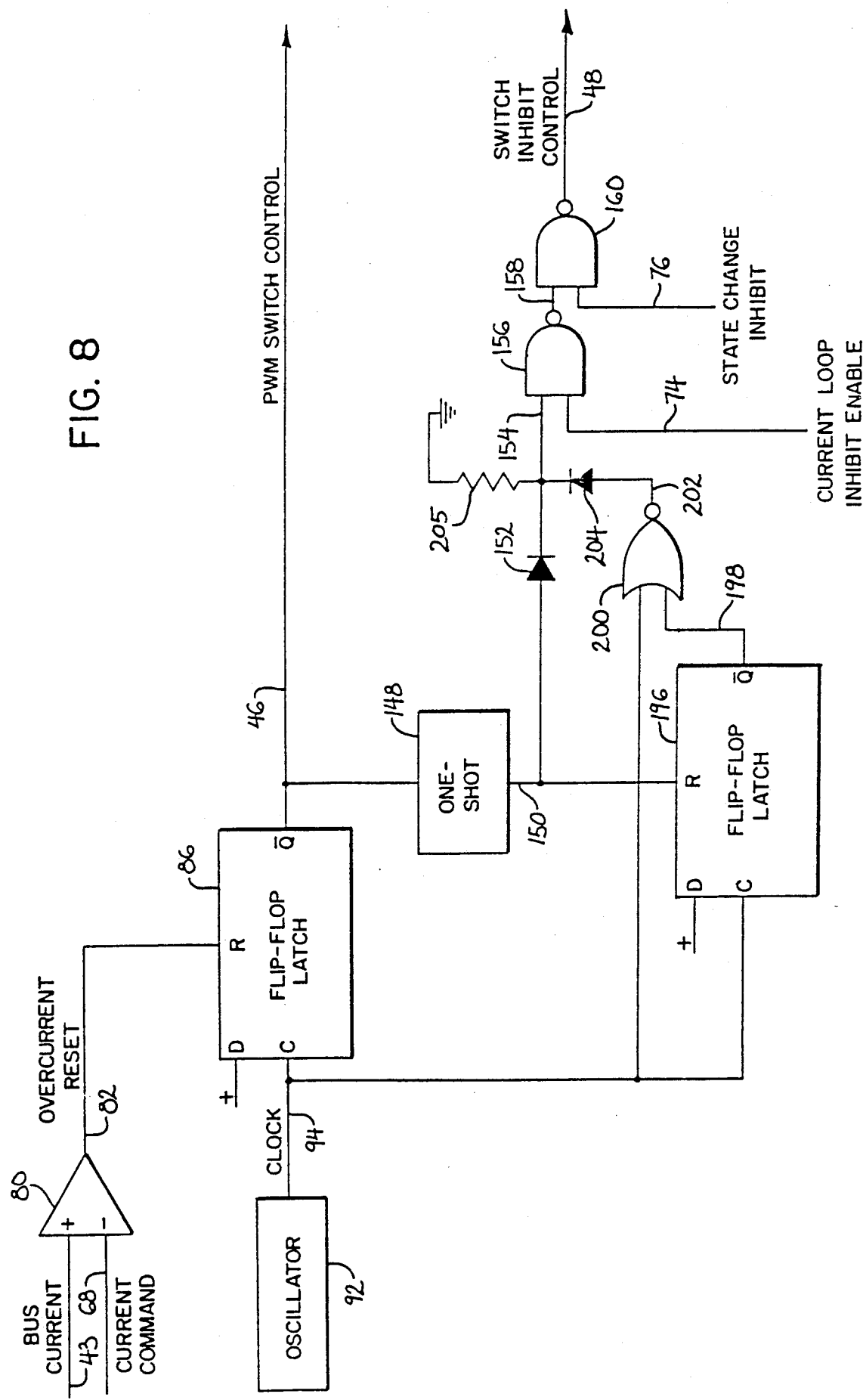
FIG. 8 is a circuit diagram showing in further detail a portion of the circuitry of FIG. 7.

FIG. 8 shows the circuitry of PWM current control and timer 44 of FIG. 7. The sensed bus current signal on line 43 is compared against the current command signal on line 68 by comparator 80 having an output 82. When the bus current signal on line 43 reaches or exceeds the current command signal on line 68, comparator output 82 goes high, as shown at positive going transition 84 in FIG. 9. Comparator output 82 is connected to the reset input of a flip flop latch 86, provided by a 4013 flip flop. The high state on line 82 resets flip flop 86 such that the latters $\overline{Q}$ output goes high, as shown at transition 88, FIG. 9. The $\overline{Q}$ output of flip flop 86 provides the PWM switch control signal on line 46. The high state of the PWM switch control signal on line 46 disables the power switch, S1-S6, then selected by multiplexer 50, such that the power switch is off. During this off interval, bus current decreases, and hence the bus current signal on line 43 drops below the current command signal on line 68, such that the overcurrent reset signal at output 82 of comparator 80 goes low, as shown at transition 90, FIG. 9.

An oscillator 92 provides clock pulses of a given frequency at output 94 which is connected to the clock input of flip flop 86. The next positive going clock pulse transition 96, FIG. 9, clocks flip flop 86 such that the latters $\overline{Q}$ output on line 46 goes low, as shown at transition 98. The low state on line 46 enables the power switch, S1–S6, selected by multiplexer 50, such that the power switch turns back on. Bus current thus increases, as shown at segment 100 in FIG. 10 after clock pulse transition 96.

The next positive going clock pulse transition 102 occurs before the bus current signal on line 43 rises above the current command signal on line 68. Hence, there is no overcurrent reset pulse on line 82 between clock pulse edges 96 and 102, and hence the PWM switch control signal on line 46 remains low during such interval. This in turn means that the selected power switch remains on, and bus current continues to rise. Positive going clock pulse transition 102 reclocks flip flop 86, and the $\overline{Q}$ output on line 46 remains low.

Figure 9:
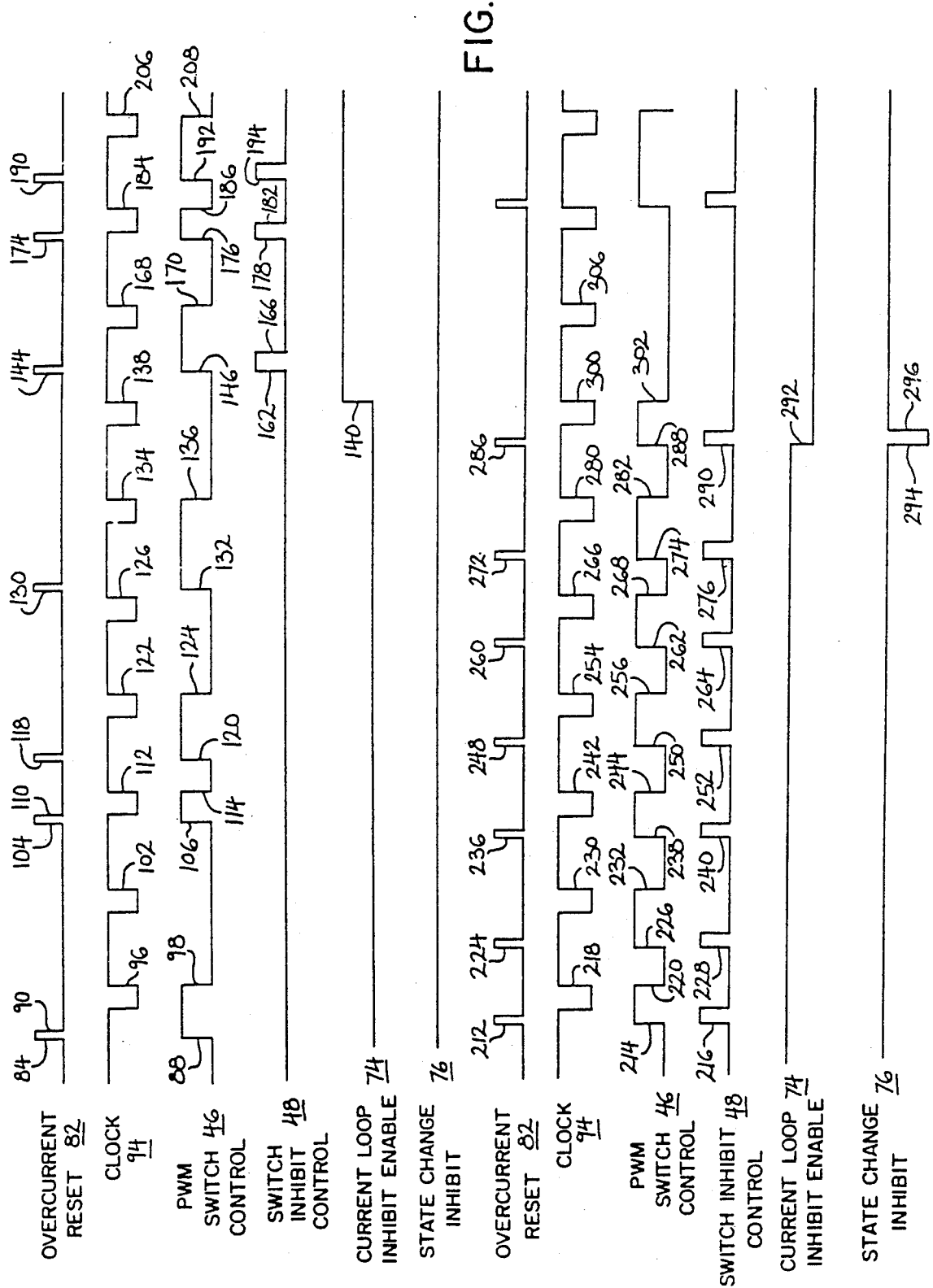
FIG. 9 is a timing diagram illustrating operation of the circuitry of FIGS. 7 and 8.
Figure 10:
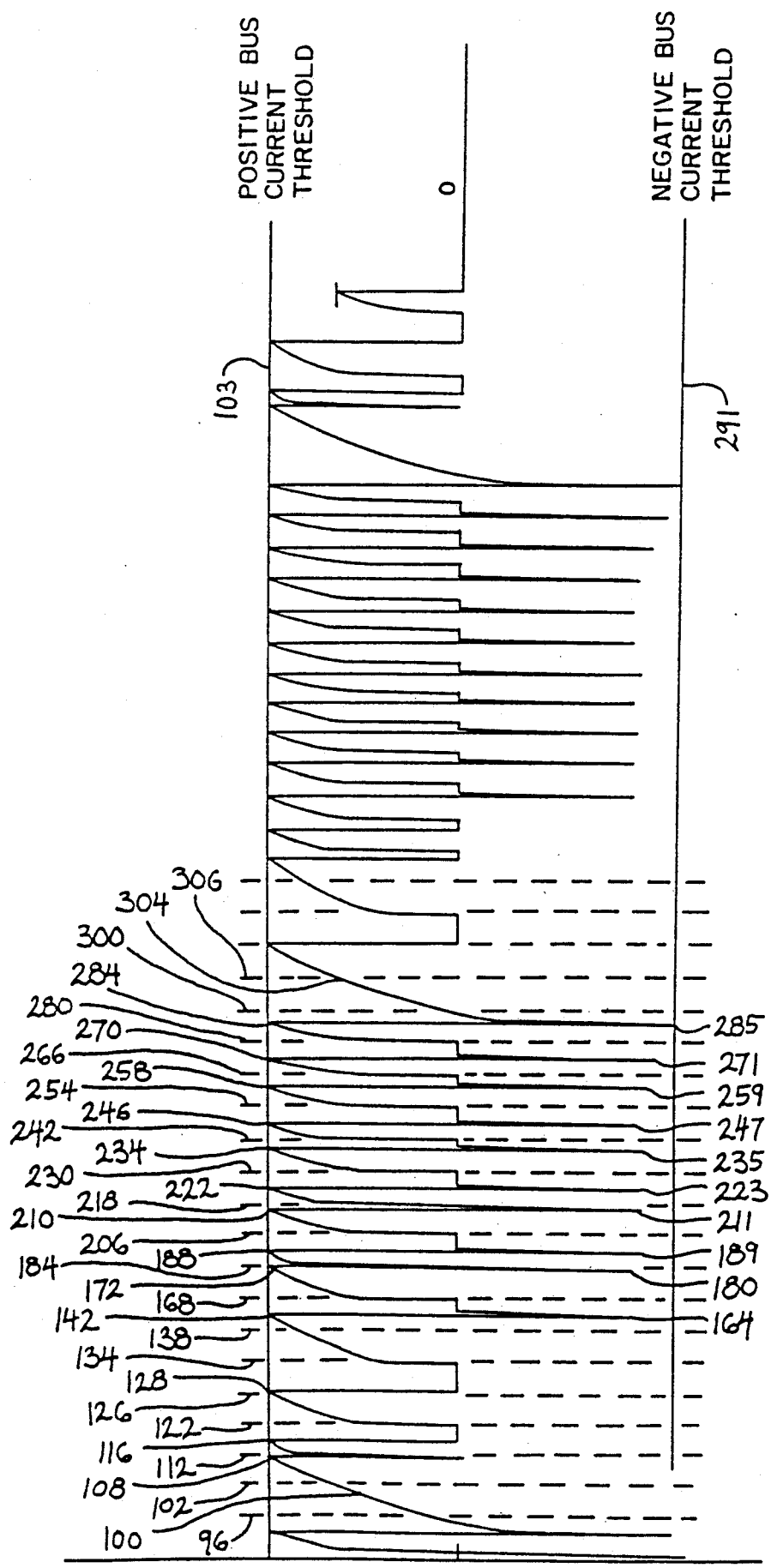
FIG. 10 is a current waveform diagram showing the current resulting from operation of the circuitry of FIGS. 7 and 8.

After clock pulse edge 102, the bus current signal continues to rise and reaches a given threshold 103, FIG. 10, i.e. the bus current signal on line 43 reaches the current command signal on line 68. Comparator output 82 then transitions high at 104, FIG. 9, to provide an overcurrent reset signal which resets flip flop 86, such that the latter's $\overline{Q}$ output on line 46 transitions high at 106, which in turn disables the selected power switch such that the latter turns off. FIG. 10 shows the bus current signal peak at point 108 reaching threshold 103, at which time PWM switch control signal transition 106 turns off the power switch, and the bus current decreases as shown immediately following point 108.

When the bus current decreases, the bus current signal on line 43 drops below the current command signal on line 68, and comparator output 82 again goes low as shown at transition 110. The next positive going clock pulse transition 112 clocks flip flop 86 such that the latter's $\overline{Q}$ output on line 46 goes low, as shown at transition 114. The low state on line 46 again turns on the power switch, such that bus current again begins to rise. The bus current signal rises to a peak at point 116, FIG. 10, at threshold 103, whereupon an overcurrent reset pulse on comparator output line 82 is generated, transition 118, which resets flip flop 86 such that the latter's $\overline{Q}$ output on line 46 transitions high at 120. The high state on line 46 turns off the power switch, such that bus current decreases. The next positive going clock pulse transition 122 clocks flip flop 86 such that the latter's Q output on line 46 transitions low at 124 which turns the power switch back on, such that bus current again begins to rise. The next positive going clock pulse transition 126 occurs just before an overcurrent reset pulse and re-clocks flip flop 86 such that the latter's $\overline{Q}$ output on line 46 remains low and the power switch remains on such that bus current continues to rise. The bus current signal rises to a peak at point 128 at threshold 103, whereupon comparator output 82 transitions high at 130 to provide an overcurrent reset pulse resetting flip flop 86 such that the latter's $\overline{Q}$ output transitions high at 132, which turns off the power switch, such that bus current decreases. The next positive going clock pulse transition 134 clocks flip flop 86 such that the latter's $\overline{Q}$ output on line 46 transitions low at 136, which turns the power switch back on, such that bus current again increases. The next positive going clock pulse transition 138 re-clocks flip flop 86, without an intermediate overcurrent reset pulse on line 82, such that the $\overline{Q}$ output on line 46 remains low, and the power switch remains on, such that bus current continues to rise.

One shot multivibrator 70, FIG. 7, is triggered by OR gate 58 to generate a low signal on output 74 of given timed duration. This low pulse on line 74 times out or ends at positive going transition 140 in FIG. 9, to be further described. After positive going clock pulse transition 138, FIG. 9 and 10, the bus current signal rises to a peak at point 142 at threshold 103, such that comparator output 82 transitions high at 144. The high state on line 82 resets flip flop 86 such that the latter's $\overline{Q}$ output on line 46 transitions high at 146. The high state on line 46 turns off the power switch, such that bus current decreases. The transition to a high state on line 46 also triggers a one shot multivibrator 148, FIG. 8, having an output 150 connected through diode 152 to input 154 of NAND gate 156. The other input of NAND gate 156 is provided by the current loop inhibit enable signal on line 74 from one shot multivibrator 70. The output 158 of NAND gate 156 provides one of the inputs to NAND gate 160. The other input to NAND gate 160 is provided by the state change inhibit signal on line 76 from one shot multivibrator 72. The output of NAND gate 160 is the switch inhibit control signal on line 48.

In response to the positive going transition 146 on line 46, one shot multivibrator 148 outputs a positive pulse at output 150 of given duration. The high state at output 150 is supplied through diode 152 to NAND gate input 154. The other input on line 74 to NAND gate 156 is also high after transition 140, such that the output of NAND gate 156 on line 158 is low. This low state causes the output of NAND gate 160 on line 48 to go high, as shown at transition 162. The positive pulse on line 48 provides a blanking pulse providing the above noted blanking interval. A high signal on line 48 disables the power switches chosen by multiplexers 50 and 54, such that bus current decreases, and there will be a negative bus current as shown at 164, FIG. 10, meaning that current is flowing back leftwardly through resistor 36 in FIG. 1, or such other bus current sensor.

At the end of the positive current pulse from one shot multivibrator 148, output 150 goes low, whereby NAND gate input 154 goes low, and NAND gate output 158 goes high. The high state on line 158 together with the high state on line 76 causes the output of NAND gate 160 on line 48 to transition low at 166, terminating the blanking interval. Comparator 60, FIG. 7, compares the maximum positive bus current signal from circuit 62, i.e. the above noted energization current $I_E$, against the bus current signal on line 43 during the blanking interal between transitions 162 and 166, i.e. the above noted inductive current plus regeneration current if present. In FIG. 10, the absolute value of this latter sum of inductive current and regeneration current at peak 164 does not exceed the energization current in the other direction at peak 142, and hence there is no triggering of OR gate 58 by comparator 60.

The next positive going clock pulse transition 168, FIG. 9, clocks flip flop 196 and flip flop 86 such that the latter's $\overline{Q}$ output on line 46 transitions low at 170 to turn the PWM selected power switch back on, such that bus current again increases. The bus current signal rises to peak 172 at threshold 103 prior to the next positive going clock pulse transition, and comparator output 82 transitions high at 174 to reset flip flop 86 such that the latter's $\overline{Q}$ output on line 46 transitions high at 176. The rising edge of the high state on line 46 triggers one shot multivibrator 148 such that the latter's output 150 goes high, which provides a high state at input 154 of NAND gate 156 which in combination with the high state on line 74 at the other input to NAND gate 156 provides a low state at output 158 which causes the output of NAND gate 160 on line 48 to transition high at 178. The high state on line 48 disables the power switches such that the latter are turned off to provide the noted blanking interval during which inductive and regeneration current as shown at negative peak 180, FIG. 10, are checked, as above described. When one shot multivibrator 148 times out, output 150 goes low, which provides a low state at input 154 of NAND gate 156 such that the latter's output 158 goes high which in combination with the high state on line 76 causes the output of NAND gate 160 on line 48 to transition low at 182. Positive going clock pulse transition 184 clocks flip flop 86 such that the latter's $\overline{Q}$ output on line 46 transitions low at 186, which turns the power switches back on, such that bus current again rises. The bus current signal rises to peak 188, FIG. 10, at threshold 103 such that comparator output 82 transitions high at 190 which resets flip flop 86 such that the latter's $\overline{Q}$ output on line 46 transitions high at 192, which turns off the PWM selected power switch. The rising edge of the high state on line 46 also triggers one shot multivibrator 148 such that the latter's output 150 goes high which provides a high state at input 154 to NAND gate 156 which in combination with the high state on line 74 at the other input to the NAND gate causes the output 158 of the NAND gate to go low, which in turn causes the output of NAND gate 160 on line 48 to transition high at 194, to provide the noted blanking interval during which the power switches are off, and inductive current and regeneration current are sensed.

Output 150 of one shot multivibrator 148 is also connected to the reset input of a flip flop latch 196, provided by a 4013 flip flop. The clock input of flip flop latch 196 is connected to line 94. The $\overline{Q}$ output of flip flop latch 196 at line 198 provides one of the inputs to a NOR gate 200. The other input to NOR gate 200 is provided by line 94. The output of NOR gate 200 on line 202 is provided through diode 204 to input 154 of NAND gate 156. Diodes 152 and 204 provide a hard wired OR gate to input 154 of NAND gate 156. The output of the hard wired OR gate is connected through pull-down resistor 205 to ground. When line 46 transitions high, line 150 goes high for the duration of the positive pulse from one shot multivibrator 148. This high state at output 150 provides a high state at NAND gate input 154 until one shot multivibrator 148 times out. The length of the positive pulse from one shot multivibrator 148 is less than the duration of the low portion of the clock cycle pulses on line 94, FIG. 9. The high state at output 150 resets flip flop latch 196 such that the latter's $\overline{Q}$ output at line 198 goes high, which in turn drives the output of NOR gate 200 at line 202 low. When one shot multivibrator 148 times out, output 150 goes low, which in combination with the low state at line 202 provides a low state at input 154 to NAND gate 156, such that the latters output 158 goes high, which in combination with the high state on line 76 causes the output of NAND gate 160 on line 48 to go low, for example as shown at transition 166 or 182. If current loop inhibit enable line 74 is already low when one shot multivibrator 148 times out, for example as shown in the timing sequences before transition 140, then output 158 of NAND gate 156 is already high, and hence the output of NAND gate 160, assuming line 76 is high, is already low, and remains low, as shown in FIG. 9. The hard wired OR gate provided by diodes 152 and 204 and the interaction of one shot multivibrator 148 and flip flop latch 196 provide a memory function, to be described.

After transition 140 on current loop inhibit enable line 74, there is always a positive pulse on line 48 for each clock pulse cycle, such that there is a blanking interval for each clock pulse cycle, and hence the inductive current and any regeneration current is sensed during each clock pulse cycle following transition 140. At positive going clock pulse transition 206 on line 94, the PWM switch control signal on line 46 transitions low at 208, to turn on the power switch, such that bus current rises. The bus current signal rises to peak 210 at threshold 103, such that comparator 80 outputs an overcurrent reset pulse on line 82 at transition 212, which causes line 46 to transition high at 214, which causes line 48 to transition high at 216, to provide the noted blanking interval. Clock pulse positive transition 218 on line 94 clocks flip flop 86 such that line 46 transitions low at 220 to turn on the power switch, such that bus current rises. The bus current signal reaches peak point 222 at threshold 103, and an overcurrent reset pulse is generated on line 82 at transition 224, whereby line 46 goes high at transition 226, and line 48 goes high at transition 228, providing the noted blanking interval. Positive going clock pulse transition 230 on line 94 clocks flip flop latch 86 such that line 46 goes low at transition 232, turning on the power switch, such that bus current again rises. The bus current rises to peak point 234 at threshold 103, to generate the overcurrent reset pulse at transition 236 on line 82, which resets flip flop latch 86, causing line 46 to go high at transition 238, causing line 48 to go high at transition 240, providing the noted blanking interval, during which the sum of inductive current and regeneration current if any is checked. Positive going clock pulse transition 242 on line 94 clocks flip flop latch 86, such that line 46 goes low at transition 244, turning the power switch back on, such that bus current again rises. The bus current signal rises to peak point 246 at threshold 103, causing line 82 to go high at transition 248, resetting flip flop latch 86, causing line 46 to transition high at 250, turning off the power switch, and causing line 48 to transition high at 252, providing the noted blanking interval. Positive going clock pulse transition 254 clocks flip flop latch 86, causing line 46 to go low at transition 256, turning the power switch back on, such that bus current again rises. The bus current signal rises to peak point 258 at threshold 103, which causes line 82 to transition high at 260, which resets flip flop latch 86, causing line 46 to go high at transition 262, turning off the power switch, and causing line 48 to transition high at 264, providing the noted blanking interval. Positive going clock pulse transition 266 on line 94 clocks flip flop latch 86, such that line 46 goes low at transition 268 to turn the power switch back on, such that bus current again increases. The bus current signal rises to peak point 270 at threshold 103, causing comparator 80 to transition high at 272 on line 82, which resets flip flop latch 86, causing line 46 to transition high at 274, turning off the power switch, and causing line 48 to transition high at 276, providing the noted blanking interval. During the blanking interval, the reverse bus current due to inductive current and regeneration current as shown at negative peak 271 has negatively increased slightly beyond that shown at negative peak 259 which has negatively increased slightly beyond that shown at negative peaks 247, 235, 223, 211, 189. The value of such current, however, still does not exceed the noted given threshold at 291 which has a magnitude of the energization current level 103 plus a small regenerative current threshold.

Positive going clock pulse transition 280 on line 94 clocks flip flop latch 86, such that line 46 goes low at transition 282, such that the power switch turns back on, and bus current again increases. The bus current signal rises to peak point 284 at threshold 103, and output line 82 of comparator 80 transitions high at 286 to reset flip flop latch 86, such that line 46 transitions high at 288 to turn off the power switch, and line 48 transitions high at 290, providing the noted blanking interval.

During the blanking interval initiated at positive going transition 290 on line 48, with the power switches turned off, the reverse bus current signal representing the above noted inductive current and regeneration current reaches negative peak 285 at threshold 291 which is greater in amplitude and opposite in polarity to threshold 103. Current comparator 60, FIG. 7, senses the absolute value of negative current peak 285 on line 43 and compares same against the absolute value of the positive peak current at level 103. The output of comparator 60 goes high when the absolute value of the current on line 43 exceeds the absolute value of the current from track and hold circuit 62 as shown at level 103. This occurs at negative peak current 285 which reaches level 291 which is greater in amplitude by the regenerative current threshold but opposite in polarity to level 103. At this point, the reverse bus current provided by inductive current and regeneration current exceeds the energization current, i.e. the bus current flowing leftwardly through resistor 36 in FIG. 1 during the blanking interval exceeds the current flowing rightwardly through resistor 36 during the energization interval.

Responsive to reverse bus current peak 285, FIG. 10, the output of current comparator 60, FIG. 7, goes high, such that the output of OR gate 58 goes high, which in turn triggers state counter 56 to change states, i.e. commutate to the next state, e.g. from state 1 to state 2, or from state 2 to state 3, etc. The high output from OR gate 58 also triggers one shot multivibrator 70, such that the latters output on line 74 transitions low at 292, FIG. 9, to provide a low pulse of given duration until one shot multivibrator 70 times out as shown at above noted positive going transition 140. The high output of OR gate 58 also triggers one shot multivibrator 72 to generate a negative going pulse at transition 294 on output line 76, which negative pulse has a very short duration and terminates at positive going transition 296. The negative pulse between transitions 294 and 296 on line 76 provides a low state to one of the inputs of NAND gate 160, FIG. 8, such that the latters output on line 48 is maintained high during such interval between transitions 294 and 296, such that the power switches are off during such interval to enable stabilization of same, including dissipation of capacitive and inductive current, upon the noted commutation.

After the noted commutation at current peak 285, FIG. 10, due to triggering of OR gate 58 by current comparator 60, the cycle repeats. Positive going clock pulse transition 300, FIG. 9, clocks flip flop latch 86, FIG. 8, and line 46 goes low at transition 302 to turn the respective chosen power switch on, such that bus current rises as shown at segment 304, FIG. 10. At positive going clock pulse transition 306, the bus current still has not risen to threshold 103, and hence there is no overcurrent reset pulse on line 82. The selected power switch remains on, and bus current continues to rise. The cycle continues as above described.

Upon commutation from one state to the next, there will be a finite amount of time before regeneration current occurs. The length of the negative current loop inhibit enable pulse from transition 292 to transition 140 is chosen accordingly. For example, in a 3,600 rpm motor, the length of such pulse is chosen to be about 1.5 milliseconds because no regeneration current will occur within 1.5 milliseconds following commutation. Upon completion of this interval, as shown at transition 140, the reverse bus current flow is checked, during the noted blanking intervals, as shown initiated at transitions 162, 178, 194, 216, 228, 240, 252, 264, 276, 290. During such intervals, the reverse bus current flow is due only to inductive current, until regeneration current occurs and increases the reverse bus current flow to the peak point at shown at 285, whereupon the circuitry is commutated to the next state.

After transition 140, reverse bus current flow is checked during each clock pulse cycle. An overcurrent reset pulse on line 82, as at transition 224, 236, etc., causes line 48 to go high at transition 228, 240, etc., to provide the noted blanking interval for checking reverse bus current flow.

Because of flip flop latch 196 and NOR gate 200, a switch inhibit control pulse on line 48 is generated for each clock pulse cycle during which the current loop inhibit enable signal on line 74 is high, regardless of whether an overcurrent reset pulse on line 82 goes high. Flip flop latch 196 remembers if one shot multivibrator 148 inhibited the power switches, and if not, lets NOR gate 200 pass the clock signal on line 94 through to inhibit the power switches. The power switches are thus inhibited once during each clock cycle while the current loop inhibit enable signal on line 74 is high. As above described, reset pulse transition 144 on line 82 initiates switch inhibit control pulse transition 162 on line 48. In response to the positive going edge of the high state on line 46 at transition 146, one shot multivibrator 148 is triggered, and output 150 goes high, which resets flip flop 196 such that the latter's $\overline{Q}$ output goes high on line 198 which maintains a high state at one of the inputs to NOR gate 200, even if the clock pulse on the other input 94 transitions low, such that the output of NOR gate 200 on line 202 remains low, and input 154 of NAND gate 156 is controlled by output 150 of one shot multivibrator 148, such that when the latter times out, line 48 goes low at transition 166. If the clock pulse on line 94 transitions high again, as at 168, before the next overcurrent reset pulse 174, flip flop 196 is clocked and its $\overline{Q}$ output on line 198 goes low, but the clock pulse on line 94 at the other input to NOR gate 200 is now high, and hence the output of NOR gate 200 on line 202 is low, such that input 154 of NAND gate 156 remains low, and line 48 remains low. If there is still no overcurrent reset pulse on line 82 before the next clock cycle, then the next negative going clock pulse transition on line 94 provides a low input to NOR gate 200 which in combination with the low state on line 198 causes the output of NOR gate 200 on line 202 to go high which in turn provides a high state at input 154 of NAND gate 156 which in turn causes the output of NAND gate 160 on line 48 to go high to provide the noted blanking interval pulse. If an overcurrent reset pulse does occur on line 82 before the next clock cycle, then the blanking interval pulse is generated as above described at transition 178 caused by transition 174 on line 82. Flip flop latch 196 and NOR gate 200 thus provide the noted memory function and guarantee a switch inhibit control pulse on line 48 to provide the noted blanking interval during each clock cycle after the current loop inhibit enable signal on line 74 transitions high at 140.

It is recognized that various equivalents, alternatives and modifications are possible within the scope of the appended claims.

I claim:

1. A method of controlling a three phase electric motor comprising energizing said phases in a cyclic sequence comprising a plurality of states, 1, 2, 3, and so on, wherein during each state, two of the phases are energized and the third phase is unenergized, sensing regeneration current from the unenergized phase, and commutating to the next state in response to said regeneration current, and further comprising:
   providing a plurality of switches;
   energizing said phases in said cyclic sequence through said switches;
   periodically turning off all of said switches simultaneously for a given blanking interval;
   sensing said regeneration current during said blanking interval.

2. The method according to claim 1 comprising:
   providing a plurality of respective reverse diodes in parallel with respective said switches;
   sensing said regeneration current by sensing current conduction through said diodes.

3. The method according to claim 2 wherein said switches are connected to a DC bus, and comprising:
   sensing one direction of current flow on said bus providing energization current supplied through respective said switches to the two energized phases in state 2;
   sensing the opposite direction of current flow on said bus from all three phases through respective said diodes during said blanking interval of said switches, to cumulatively sense on said bus the inductive current from the energized phases of state 2 and the regeneration current form the unenergized phase of state 2;
   commutating to state 3 in response to a given differential between said energization current in said one direction on said bus and the sum of said inductive current and said regeneration current in the opposite direction on said bus.

4. The method according to claim 3 comprising commutating to state 3 when said sum of said inductive current and said regeneration current in said opposite direction on said bus exceeds said energization current in said one direction on said bus.

5. A method of controlling a three phase electric motor comprising energizing said phases in a cyclic sequence comprising a plurality of states, 1, 2, 3, and so on, wherein during each state, two of the phases are energized and the third phase is unenergized, sensing regeneration current from the unenergized phase, and commutating to the next state in response to said regeneration current, and further comprising in combination commutating to state 3 in response to a given time lapse if said regeneration current is not sensed.

6. A method of controlling a three phase electric motor comprising:
   energizing said phases in a cyclic sequence comprising a plurality of states, 1, 2, 3, and so on, wherein during each state, two of the phases are energized and the third phase is unenergized;
   sensing regeneration current from the unenergized phase, said regeneration current flowing in a given direction in the unenergized phase A in state 2;
   in state 1 energizing phase A in a polarity aiding said regeneration current of state 2, to direct current through phase A in the same direction as said regeneration current of state 2;
   commutating from state 2 to state 3 in response to said regeneration current;
   in state 3 energizing phase A in a polarity opposing said regeneration current of state 2, to direct current through phase A in the opposite direction to said regeneration current of state 2;
   providing a DC bus;
   providing a plurality of switches connected to said DC bus;
   energizing said phases in said cyclic sequence through said switches;
   periodically turning off all of said switches simultaneously for a given blanking interval;
   providing a plurality of respective reverse diodes in parallel with respective said switches;
   sensing one direction of current flow on said bus providing energization current supplied through respective said switches to the two energized phases in state 2;
   sensing said regeneration current during said blanking interval by sensing the opposite direction of current flow on said bus from all three phases through respective said diodes, to cumulatively sense on said bus the inductive current from the energized phases of state 2 and the regeneration current from the unenergized phase A of state 2;
   commutating to state 3 in response to a given differential between said energization current in said one direction on said bus and the sum of said inductive current and said regeneration current in the opposite direction on said bus.

7. The method according to claim 6 comprising in combination commutating to state 3 in response to a given time lapse if said given differential between said energization current and said sum of said inductive current and said regeneration current is not reached.

8. A method of controlling a three phase electric motor having phases A, B, and C, comprising energizing said phases in a cyclic sequence comprising six states, 1, 2, 3, 4, 5, and 6, wherein during each state, two of the phases are energized, and the third phase is unenergized, comprising:
   in state 1,
      energizing phases A and B,
      sensing regeneration current in phase C,
      commutating to state 2 in response to said regeneration current;
   in state 2,
      energizing phase C in the opposite polarity as said regeneration current in state 1,
      energizing phase B in the same polarity as energization current in state 1, sensing regeneration current in phase A in the same polarity as energization current in state 1,
commutating to state 3 in response to said last mentioned regeneration current;

in state 3,
energizing phase A in the opposite polarity as said regeneration current in state 2, and in the opposite polarity as energization current in state 1,
energizing phase C in the same polarity as energization current in state 2,
sensing regeneration current in phase B in the same polarity as energization current in state 2,
commutating to state 4 in response to said last mentioned regeneration current;

in state 2,
commutating to state 4 in response to said last mentioned regeneration current;

in state 4,
energizing phase B in the opposite polarity as said regeneration current in state 3, and in the opposite polarity as energization current in state 2,
energizing phase A in the same polarity as energization current in state 3,
sensing regeneration current in phase C in the same polarity as energization current in state 3,
commutating to state 5 in response to said last mentioned regeneration current;

in state 5,
energizing phase C in the opposite polarity as said regeneration current in state 4, and in the opposite polarity as energization current in state 3,
energizing phase B in the same polarity as energization current in state 4,
sensing regeneration current in phase A in the same polarity as energization current in state 4,
commutating to state 6 in response to said last mentioned regeneration current, in state 6,
energizing phase A in the opposite polarity as said regeneration current in state 5, and in the opposite polarity as energization current in state 4,
energizing phase C in the same polarity as energization current in state 5,
sensing regeneration current in phase B in the same polarity as energization current in state 5,
commutating to state 1 in response to said last mentioned regeneration current;

in state 1,
energizing phase B in the opposite polarity as said regeneration current in state 6, and in the opposite polarity as energization current in state 5,
energizing phase A in the same polarity as energization current in state 6,
sensing regeneration current in phase C in the same polarity as energization current in state 6,
commutating to state 2 in response to said last mentioned regeneration current, and so on to repeat the cycle.

9. The method according to claim 8 comprising providing six switches, S1, S2, S3, S4, S5, and S6, providing a DC bus having a pair of conductors, wherein switches S1, S3, S5 are connected in common to one of said bus conductors, and switches S2, S4, S6 are connected in common to the other of said bus conductors, each phase comprising a winding, the phase A winding has one end connected to a node between switches S1 and S2 and another end connected to a common phase node, the phase B winding has one end connected to a node between switches S3 and S4 and has another end connected to said common phase node, the phase C winding has one end connected to a node between switches S5 and S6 and has another end connected to said common phase node, comprising:

in state 1,
turning on switch S1,
pulse width modulating switch S4 between on and off conditions;

in state 2,
turning on switch S4,
pulse width modulating switch S5 between on and off conditions;

in state 3,
turning on switch S5,
pulse width modulating switch S2 between on and off conditions;

in state 4,
turning on switch S2,
pulse width modulating switch S3 between on and off conditions;

in state 5,
turning on switch S3,
pulse width modulating switch S6 between on and of conditions;

in state 6,
turning on switch S6,
pulse width modulating switch S1 between on and off conditions;

turning off all said switches simultaneously for a given blanking interval at least once in each of said six states;
sensing said regeneration current during said blanking interval in each of said states.

10. The method according to claim 9 comprising providing six diodes D1, D2, D3, D4, D5, and D6, one for each of said six switches and connected in reverse parallel therewith, respectively, comprising:

in state 1,
sensing said regeneration current in phase C by sensing current through diode D5;

in state 2,
sensing said regeneration current in phase A by sensing current through diode D2;

in state 3,
sensing said regeneration current in phase B by sensing current through diode D3;

in state 4,
sensing said regeneration current in phase C by sensing current through diode D6;

in state 5,
sensing said regeneration current in phase A by sensing current through diode D1;

in state 6,
sensing said regeneration current in phase B by sensing current through diode D4.

11. The method according to claim 10 comprising:
in state 1,
sensing bus current flow in one direction from said one bus conductor through switch S1, through the phase A winding, through the phase B winding, through switch S4 to said other bus conductor,
during said blanking interval in state 1, sensing the opposite direction of bus current flow from said other bus conductor through diode D2, through the phase A winding due to inductance of the latter, through the phase B winding due to inductance of the latter, through diode D3 to said one bus conductor, plus regeneration current through the phase C winding and diode D5 to said one bus conductor, to cumulatively sense on said bus the inductive current in phases A and B and the regeneration current in phase C, commutating to state 2 in response to a given differential between said energization current in said one direction on said bus and the sum of said inductive current and said regeneration current in said opposite direct on said bus;

in state 2, sensing said one direction of bus current flow from said one bus conductor through switch S5, through the phase C winding, through the phase B winding, through switch S4 to said other bus conductor, during said blanking interval in state 2, sensing said opposite direction of bus current flow from said other bus conductor through diode D6, through the phase C winding due to inductance of the latter, through the phase B winding due to inductance of the latter, through diode D3 to said one bus conductor, plus regeneration current from said other bus conductor through diode D2 and the phase A winding, to cumulatively sense on said bus the inductive current from phases C and B and the regeneration current from phase A, commutating to state 3 in response to a given differential between said last mentioned energization current in said one direction on said bus and said last mentioned sum of said inductive current and said regeneration current in said opposite direction on said bus;

in state 3, sensing bus current flow in one direction from said one bus conductor through switch S5, through the phase C winding, through the phase A winding, through switch S2 to said other bus conductor, during said blanking interval in state 3, sensing the opposite direction of bus current flow from said other bus conductor through diode D6, through the phase C winding due to inductance of the latter, through the phase A winding due to inductance of the latter, through diode D1 to said one bus conductor, plus regeneration current through the phase B winding and diode D3 to said one bus conductor, to cumulatively sense on said bus the inductive current from phases C and A and the regeneration current from phase B, commutating to state 4 in response to a given differential between said last mentioned energization current in said one direction on said bus and said last mentioned sum of said inductive current and said regeneration current in said opposite direction on said bus;

in state 4, sensing bus current flow in said one direction from said bus through switch S3, through the phase B winding, through the phase A winding, through switch S2 to said other bus conductor, during said blanking interval in state 4, sensing said opposite direction of bus current flow from said other bus conductor through diode D4, through the phase B winding due to inductance of the latter, through the phase A winding due to inductance of the latter, through diode D1 to said one bus conductor, plus regeneration current from said other bus conductor through diode D6 and the phase C winding, to cumulatively sense on said bus the inductive current in phases A and B and the regeneration current from phase C, commutating to state 5 in response to a given differential between said last mentioned energization current in said one direction on said bus and said last mentioned sum of said inductive current and said regeneration current in said opposite direction on said bus;

in state 5, sensing bus current flow in one direction from said one bus conductor through switch S3, through the phase B winding, through the phase C winding, through switch S6 to said other bus conductor, during said blanking interval in state 5, sensing said opposite direction of bus current flow from said other bus conductor through diode D4, through the phase B winding due to inductance of the latter, through the phase C winding due to inductance of the latter, through diode D5 to said one bus conductor, plus regeneration current through the phase A winding and diode D1 to said one bus conductor, to cumulatively sense on said bus the inductive current in phases B and C and the regeneration current in phase A, commutating to state 6 in response to a given differential between said last mentioned energization current in said one direction on said bus and said last mentioned sum of said inductive current and said regeneration current in said opposite direction on said bus;

in state 6, sensing said one direction of bus current flow from said one bus conductor through switch S1, through the phase A winding, through the phase C winding, through switch S6 to said other bus conductor, during said blanking interval in state 6, sensing said opposite direction of bus current flow from said other bus conductor through diode D2, through the phase A winding due to inductance of the latter, through the phase C winding due to inductance of the latter, through diode D5 to said one bus conductor, plus regeneration current from said other bus conductor through diode D4 and the phase B winding, to cumulatively sense on said bus the inductive current in phases A and C and the regeneration current in phase B, commutating to state 1 in response to a given differential between said last mentioned energization current in said one direction on said bus and said last mentioned sum of said inductive current and said regeneration current in said opposite direction on said bus.

12. A control circuit for controlling a three phase electric motor comprising means for energizing said phases in a cyclic sequence comprising a plurality of states, 1, 2, 3, and so on, wherein during each state, two of the phases are energized and the third phase is unenergized, means for sensing regeneration current in the unenergized phase, and means for commutating to the next state in response to said regeneration current, and further comprising in combination means for commutating to state 3 in response to a give time lapse if said regeneration current is not sensed.

13. A control circuit for controlling a three phase electric motor comprising:
   a plurality of switches;
   means for energizing said phases through said switches in a cyclic sequence comprising a plurality of states, wherein during each state, two of the phases are energized and the third phase is unenergized;
   means for periodically turning off all of said switches simultaneously for a given blanking interval;
   means for sensing regeneration current in the unenergized phase during said blanking interval;
   means for commutating to the next state in response to said regeneration current.

14. The control circuit according to claim 13 comprising a plurality of respective reverse diodes connected in parallel with respective said switches, and wherein said means for sensing said regeneration current senses current conduction through said diodes.

15. The control circuit according to claim 14 comprising a DC bus to which said switches are connected, and wherein said regeneration current sensing means senses one direction of current flow on said bus providing energization current supplied through respective said switches to the two energized phases in the present state, and senses the opposite direction of current flow on said bus from all three phases through respective said diodes during said blanking interval of said switches, to cummulatively sense on said bus the inductive current in the energized phases of the present state and the regeneration current in the unenergized phase of the present state, and wherein said commutating means commutates to the next state in response to a given differential between said energization current in said one direction on said bus and the sum of said inductive current and said regeneration current in the opposite direction on said bus.

16. The control circuit according to claim 15 further comprising in combination means for commutating to the next state in response to a given time lapse if said given differential between said energization current and said sum of said inductive current and regeneration current is not reached.

17. A control circuit for controlling a three phase electric motor comprising means for energizing said phases in a cyclic sequence comprising a plurality of states, 1, 2, 3, and so on, wherein during each state, two of the phases are energized and the third phase is unenergized, means for sensing regeneration current in the unenergized phase, said regeneration current flowing in a given direction in the unenergized phase A in state 2, means for commutating to state 3 in response to said regeneration current, means operative in state 1 and energizing phase A in a polarity aiding said regeneration current of state 2 to direct current through phase A in the same direction as said regeneration current of state 2, and means operative in state 3 and energizing phase A in a polarity opposing said regeneration current of state 2 to direct current through phase A in the opposite direction to said regeneration current of state 2.

18. The control circuit according to claim 17 comprising:
   a DC bus;
   a plurality of switches through which said phases are energized in said cyclic sequence from said DC bus;
   a plurality of respective reverse diodes connected in parallel with respective said switches;
   means for periodically turning off all of said switches simultaneously for a given blanking interval at least once during each of said states;
   wherein said regeneration current sensing means sense regeneration current during said blanking interval by sensing current conduction through said diodes, said regeneration current sensing means sensing one direction of current flow on said bus providing energization current supplied through respective said switches to the two energized phases in state 2, and sensing the opposite direction of current flow on said bus from all three phases through respective said diodes during said off interval of said switches, to cumulatively sense on said bus said inductive current from the energized phase of state 2 and said regeneration current from phase A;
   and wherein said commutating means commutates to state 3 in response to a given differential between said energization current in said one direction on said bus and the sum of said inductive current and said regeneration current in the opposite direction on said bus.

* * * * *